(12) United States Patent
Fukumoto et al.

(10) Patent No.: US 6,415,636 B1
(45) Date of Patent: Jul. 9, 2002

(54) VEHICULAR DOOR LOCK OPERATION SYSTEM AND VEHICULAR DOOR HAVING THE SAME

(75) Inventors: Ryoichi Fukumoto, Nagoya; Tetsuro Tanimoto, Anjo; Masayuki Uchitsunemi, Chiryu, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/538,488

(22) Filed: Mar. 30, 2000

(30) Foreign Application Priority Data

Mar. 30, 1999  (JP) ............................................ 11-090059

(51) Int. Cl.[7] ............................................. E05B 13/00
(52) U.S. Cl. ............................. 70/208; 70/370; 70/451; 70/466; 292/336.3; 292/DIG. 31; 292/DIG. 53
(58) Field of Search ......................... 70/208, 370, 451, 70/466; 292/DIG. 31, 336.3, DIG. 53

(56) References Cited

U.S. PATENT DOCUMENTS

| | | | | |
|---|---|---|---|---|
| 2,658,783 A | * | 4/1953 | Allen | 292/DIG. 24 X |
| 2,665,156 A | * | 1/1954 | Allen | 292/DIG. 24 X |
| 2,739,831 A | * | 3/1956 | Jakeway | 292/336.3 |
| 2,864,641 A | * | 12/1958 | Leslie | 292/336.3 |
| 3,201,165 A | * | 8/1965 | Trudeau | 292/336.3 |
| 3,868,836 A | * | 3/1975 | LaRoche | 70/370 X |
| 5,127,686 A | * | 7/1992 | Gleason et al. | 70/208 X |
| 5,450,735 A | * | 9/1995 | Esaki et al. | 70/208 |
| 5,882,053 A | * | 3/1999 | Bekins et al. | 292/336.3 |
| 5,987,943 A | * | 11/1999 | Verga et al. | 292/DIG. 31 X |
| 6,014,876 A | * | 1/2000 | Taylor | 70/370 X |
| 6,018,969 A | * | 2/2000 | Haseley et al. | 292/DIG. 60 X |
| 6,059,329 A | * | 5/2000 | Spitzley | 292/336.3 |

FOREIGN PATENT DOCUMENTS

| | | | |
|---|---|---|---|
| DE | 6801812 | | 10/1970 |
| DE | 44 05 383 | | 4/1995 |
| EP | 0 646 688 | | 12/1996 |
| JP | 403213424 A | * | 9/1991 ................. 70/208 |
| JP | 5-201252 | | 8/1993 |
| JP | 7-17248 | | 1/1995 |

* cited by examiner

Primary Examiner—Lloyd A. Gall
(74) Attorney, Agent, or Firm—Burns, Doane, Swecker & Mathis, LLP

(57) ABSTRACT

A vehicular door lock operation system includes a base member fixed on an interior surface of a door outer panel, a handle rotatably supported on the base member and linked to a opening member of a door lock device, a door key cylinder supported by the base member and linked to a locking member of the door lock device, a connecting member which connects the handle and the opening member of the door lock device, and a supporting portion positioned close to the door key cylinder and supporting the connecting member. In such a vehicular door lock operation system, the assembly operation of the door lock device becomes more simplified than in the conventional vehicular door lock operation system.

7 Claims, 13 Drawing Sheets

VEHICULAR DOOR LOCK OPERATION SYSTEM AND VEHICULAR DOOR HAVING THE SAME

This application corresponds to and claims priority under 35 U.S.C. §119 with respect to Japanese Patent Application No. 11-90059 filed on Mar. 30, 1999, the entire content of which is incorporated herein by reference.

FIELD OF THE INVENTION

The present invention pertains to a vehicular door lock operation system for manipulating a door lock device and a vehicular door having such a vehicular door look operation system.

BACKGROUND OF THE INVENTION

Japanese Patent Laid-open Print No. Hei. 7-17248 published in 1995 without examination discloses a conventional vehicular door lock operation system, while Japanese Patent Laid-open Print No. Hei. 5-201252 published in 1993 without examination discloses a conventional vehicular door, both of which are incorporated herein by reference.

Conventional vehicular door lock operation systems are often made up of (a) a base member secured to the interior of an outside surface of a door outer panel, (b) a door lock device positioned between the door outer panel and a door inner panel, (c) a handle rotatably mounted on the base member, and (d) a connecting member linking the handle to the opening member of the door lock device.

However, in conventional door lock operation systems, the connecting member is only connected at its opposite ends to the respective handle and the opening member, with the handle being positioned on the interior of the outside surface of the door outer panel, and the door lock device being placed between the door outer panel and the door inner panel. This results in that the allocation or positioning of the door lock device and the linkage between the handle and the opening member of the door lock device have to be accomplished through a service hole formed in the door inner panel. This configuration causes the assembly operation of the door lock operation system to become very cumbersome.

Conventional door lock devices are often provided with (a) a door outer panel constituting an outer profile of a vehicle door, (b) a door inner panel secured to an inside surface of the door outer panel, and (c) a trim secured to an inside surface of the door inner panel for constituting an inner profile of the vehicle door. Conventional door lock devices are also often fixed to an inside surface of the door inner panel, thereby being covered with the door trim.

Conventional door lock devices are also often positioned between the door inner panel and the door outer panel, indeed, simplifying the assembly operation of the door lock device. However, the connection between the handle and the opening member of the door lock device is similar to the above-mentioned door lock operation systems, in that, the assembly operation of the door lock device is still cumbersome.

Thus, a need exists to make the assembly operation of the door lock device simpler and less cumbersome.

SUMMARY OF THE INVENTION

The present invention has been developed to overcome the above-noted problems with known door lock devices.

A first aspect of the present invention provides a vehicular door lock operation system which includes:

- a base member fixed on an interior surface of a door outer panel,
- a handle rotatably supported on the base member and linked to an opening member of a door lock device,
- a door key cylinder supported by the base member and linked to a locking member of the door lock device,
- a connecting member which connects the handle and the opening member of the door lock device, and
- a supporting portion positioned adjacent to the door key cylinder and supporting the connecting member.

In accordance with the first aspect of the present invention, the connecting member is supported by the supporting portion and is supported at its opposite ends by the handle and the opening member, which allows the door lock operation system to be configured as a unit, thereby establishing a simplified connection between the handle and the opening member of the door lock device.

Preferably, the supporting portion is a flange portion that is integrally formed with a rotary case of the door key cylinder.

Preferably, the flange portion has a passing-through hole through which the connecting member passes, and a seal member is positioned around the passing-through hole for establishing a fluid-tight relationship between the connecting member and the flange portion.

Preferably, the door lock device is mounted on an interior surface of a door inner panel.

Preferably, the door inner panel has a passing-through hole through which the rotary case passes, and a seal member is positioned around the passing-through hole for establishing a fluid-tight relationship between the rotary case and the door inner panel.

In addition, a second aspect of the present invention provides a vehicular door which includes:

- a door outer panel,
- a door inner panel secured to an interior surface of the door outer panel,
- a trim secured to an interior surface of the door inner panel and constituting an inner profile of the vehicle interior,
- a door lock device having an opening member and a locking member, the door lock device being secured to the interior surface of the door inner panel and being positioned between the door inner panel and the door trim, and
- a door lock operation system including a handle mounted on the door outer panel and linked to the opening member of the door lock device, a door key cylinder linked to the locking member of the door lock device, a first connecting member and a second connecting member, each said first and second connecting members having first and second ends, said first end of the first connecting member being connected to the handle, said second end of the first connecting member being detachably connected to the opening member of the door lock device, said first end of the second connecting member being connected to the door key cylinder, and said second end of the second connecting member being detachably connected to the opening member of the door lock device.

In accordance with the second aspect of the present invention, connecting the first connecting member to the handle and the opening element, and the second connecting member to the door key cylinder and the locking element, allows for the linkage of the handle and the door key cylinder to the opening element and the locking element, respectively, to be contained within the vehicle door interior. Thus, improving the assembly operation of the door lock device.

Preferably, the door inner panel has a passing-through hole through which the first connecting member and the second connecting member pass.

Preferably, the door key cylinder has a rotary case through which the first connecting member passes, wherein the rotary case passes through and is supported by a passing-through hole provided in the door inner panel.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE INVENTION

Figure 1:
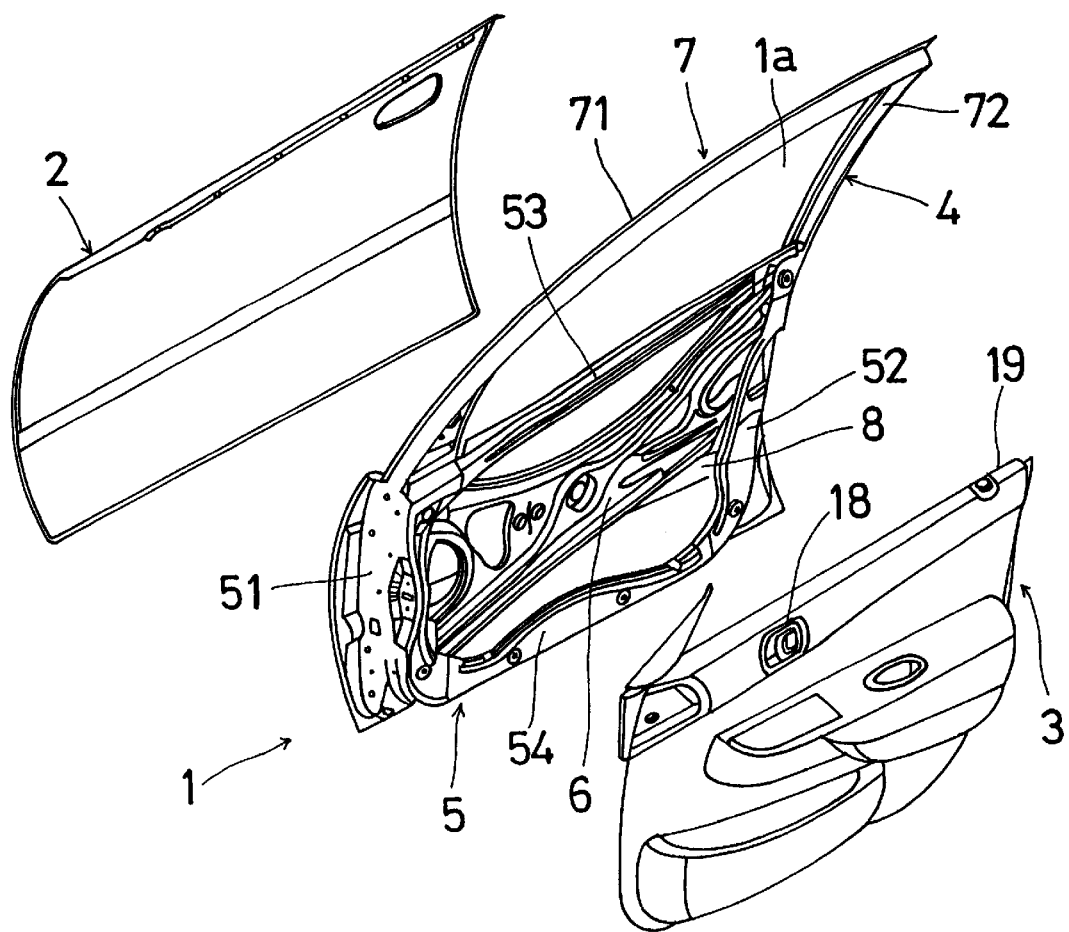
FIG. 1 illustrates an exploded perspective view of a vehicular door in accordance with an embodiment of the present invention.

With reference to FIG. 1, a vehicular door 1 is made up of a door outer panel 2, a door trim 3, and an inner module 4. The door outer panel 2 and the door trim 3 constitute an exterior member and an interior member, respectively. The inner module 4 acts as a main frame of the vehicular door 1 and supports at an exterior side and interior side thereof the door outer panel 2 and the door trim 3, respectively.

Figure 2:
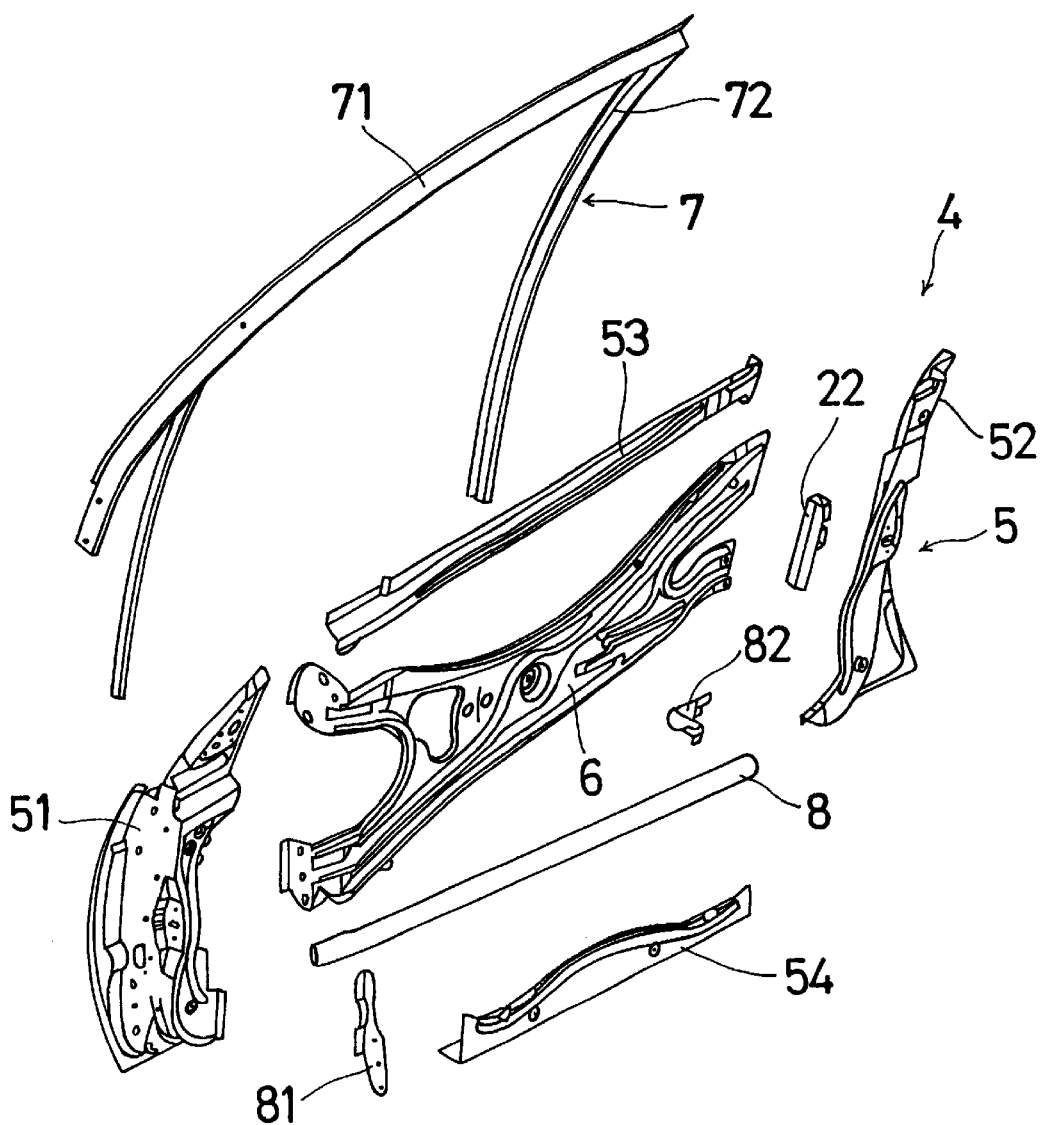
FIG. 2 illustrates an exploded perspective view of an inner module of the vehicular door shown in FIG. 1.
Figure 3:
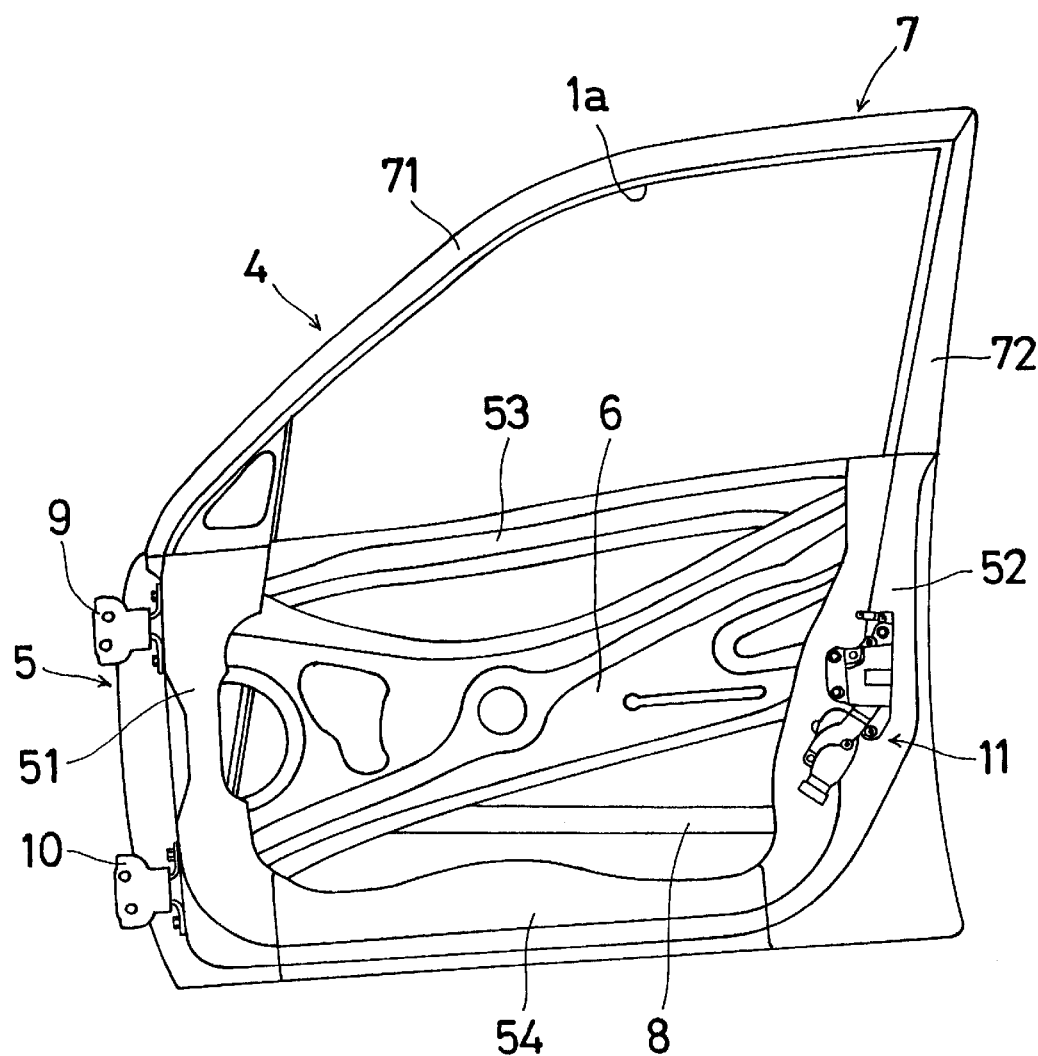
FIG. 3 illustrates a front view of the vehicular door shown in FIG. 1.

As depicted in FIGS. 1 to 3, the inner module 4 is made up of a door inner panel 5, a base panel 6, a door frame 7, and a door impact beam 8.

The door inner panel 5 is constituted by a hinge side panel 51, a lock side panel 52, an upper reinforcing member 53, and a lower panel 54. The hinge side panel 51 is placed at a front end (the left side in FIG. 1) of the door outer panel 2 and extends in the vertical direction, thereby constituting a front end wall of the vehicular door 1. The lock side panel 52 is placed at a rear end (the right side in FIG. 1) of the door outer panel 2 and extends in the vertical direction, thereby constituting a rear end wall of the vehicular door 1.

The upper reinforcing member 53 is positioned at an upper end or belt line portion of the door outer panel 2 and extends therealong in such a manner that the front end and the rear end of the upper reinforcing member 53 are welded to the hinge side panel 51 and the lock side panel 52, respectively. The lower panel 54 is placed at a lower end of the door outer panel 2 so as to be extended therealong and the front end and the rear end of the lower panel 54 are welded to the hinge side panel 51 and the lock side panel 52.

Thus, the door inner panel 5 becomes an elongated bar shaped structure and when fixed with the front, rear, and lower peripheries of the door outer panel, defines an indoor space A which opens at the belt line portion. This indoor space A is used for accommodating therein a window pane (not shown) which opens and closes a window portion 1a as will be detailed later.

In addition, the hinge side panel 51 is provided with a pair of vertically spaced hinge members 9 and 10 which support the front end of the vehicular door 1 in such a manner that the vehicular door 1 can swing about the hinge members 9 and 10. The lock side panel 52 is provided with a door lock device 11 which connects the rear end of the vehicular door 1 and the vehicle body 12 in detachable manner. Thus, the vehicular door 1 is supported or connected to the vehicle body 12 in a detachable fashion.

The base panel 6 is configured to be a substantially X-shaped structure, is welded to the hinge side panel 51 and the lock side panel 52, and ensures the required torsional rigidity of the vehicular door 1.

The door frame 7 which defines the window portion 1a in the vehicular door 1 is constructed by welding two members: the front roof pillar member 71 and the center pillar member 72, the central pillar member 72 having a closed cross-sectional configuration. The ends of the door frame 7, at the sides of the front roof pillar member 71 and the center pillar member 72, are welded to the hinge side panel 51 and the lock side panel 52, respectively.

The door impact beam 8 is of an elongate pipe configuration and is placed at the exterior side of the base plate 6 in the indoor space A, so as to be parallel to the upper reinforcing member 53 and the lower panel 54. The opposite ends of the door impact beam 8 are coupled to the hinge side panel 51 and the lock side panel 52 via brackets 81 and 82, respectively.

It is to be noted that at the interior side of the door inner panel 5, the base panel and the door impact beam 8 are covered via a sealing member 23 and a covering member 24.

Figure 4:
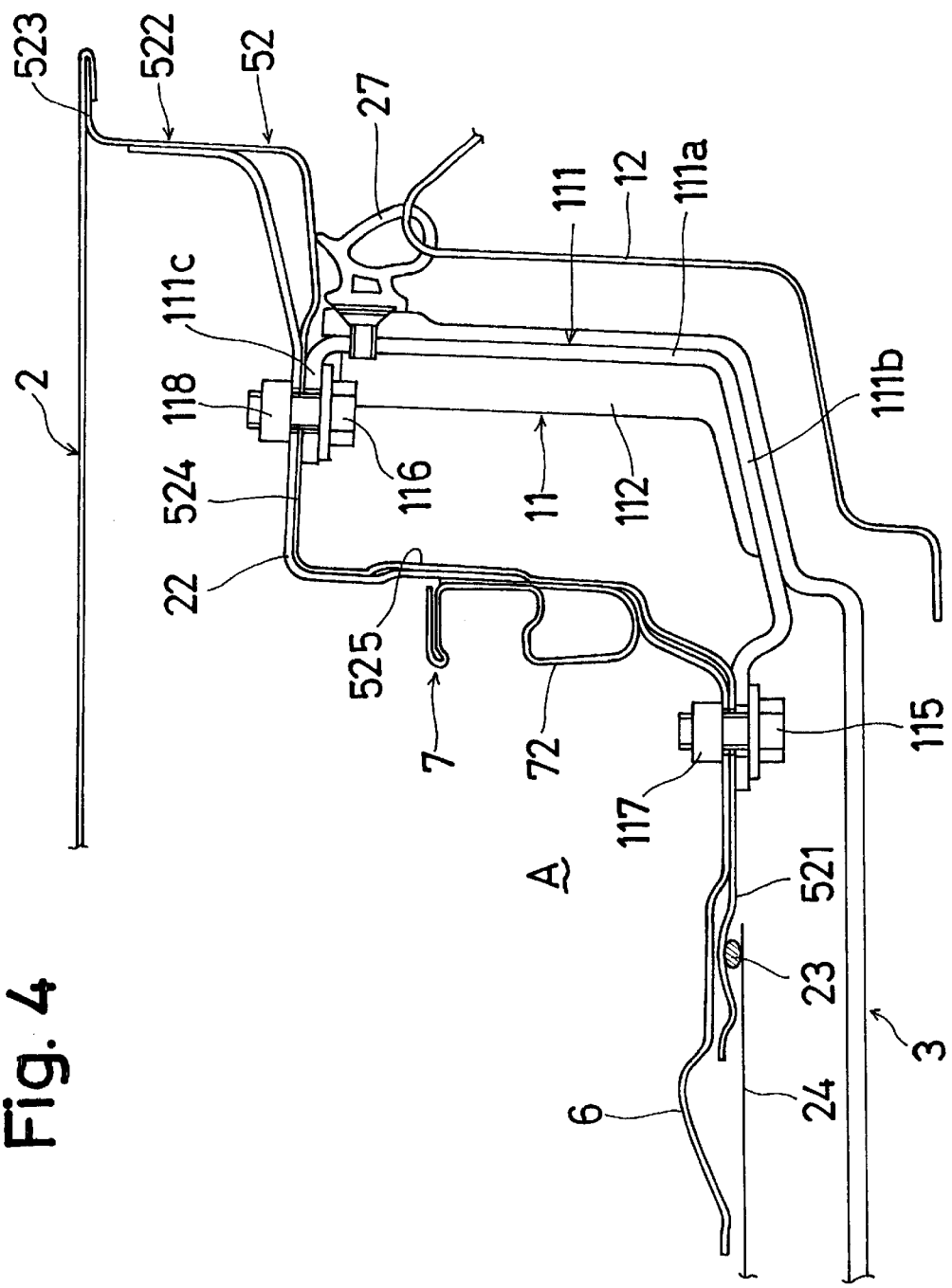
FIG. 4 illustrates a cross-sectional view of the vehicular door shown in FIG. 1 with a door lock device provided.
Figure 5:
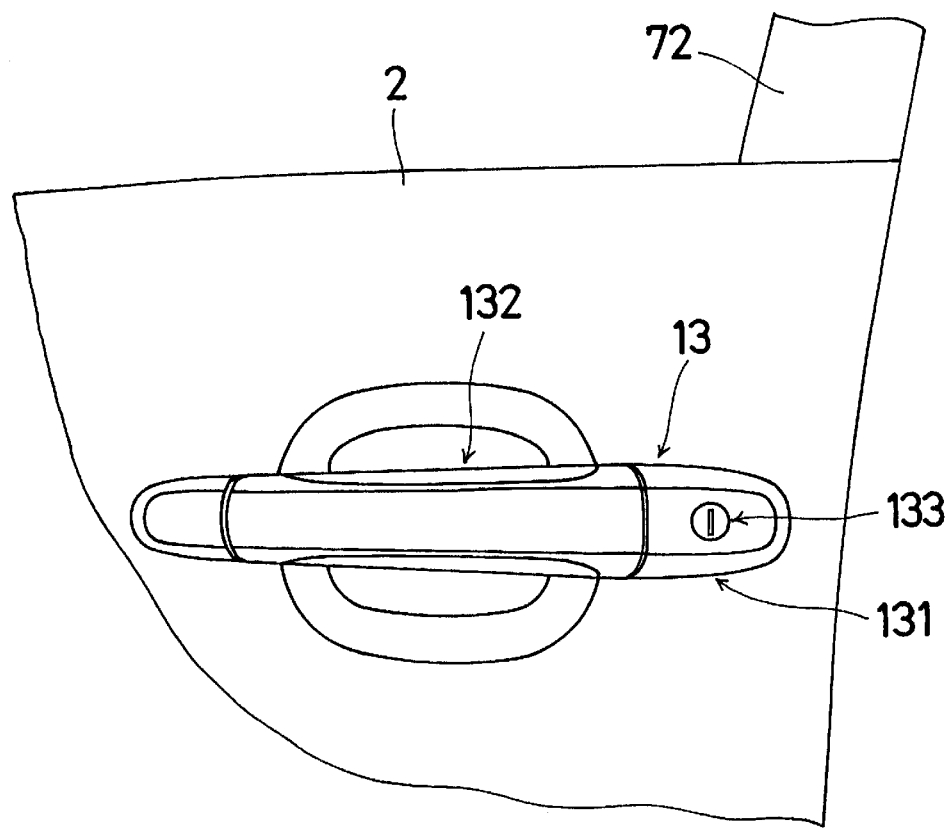
FIG. 5 illustrates a front view of a door lock operation system in accordance with an embodiment of the present invention.
Figure 6:
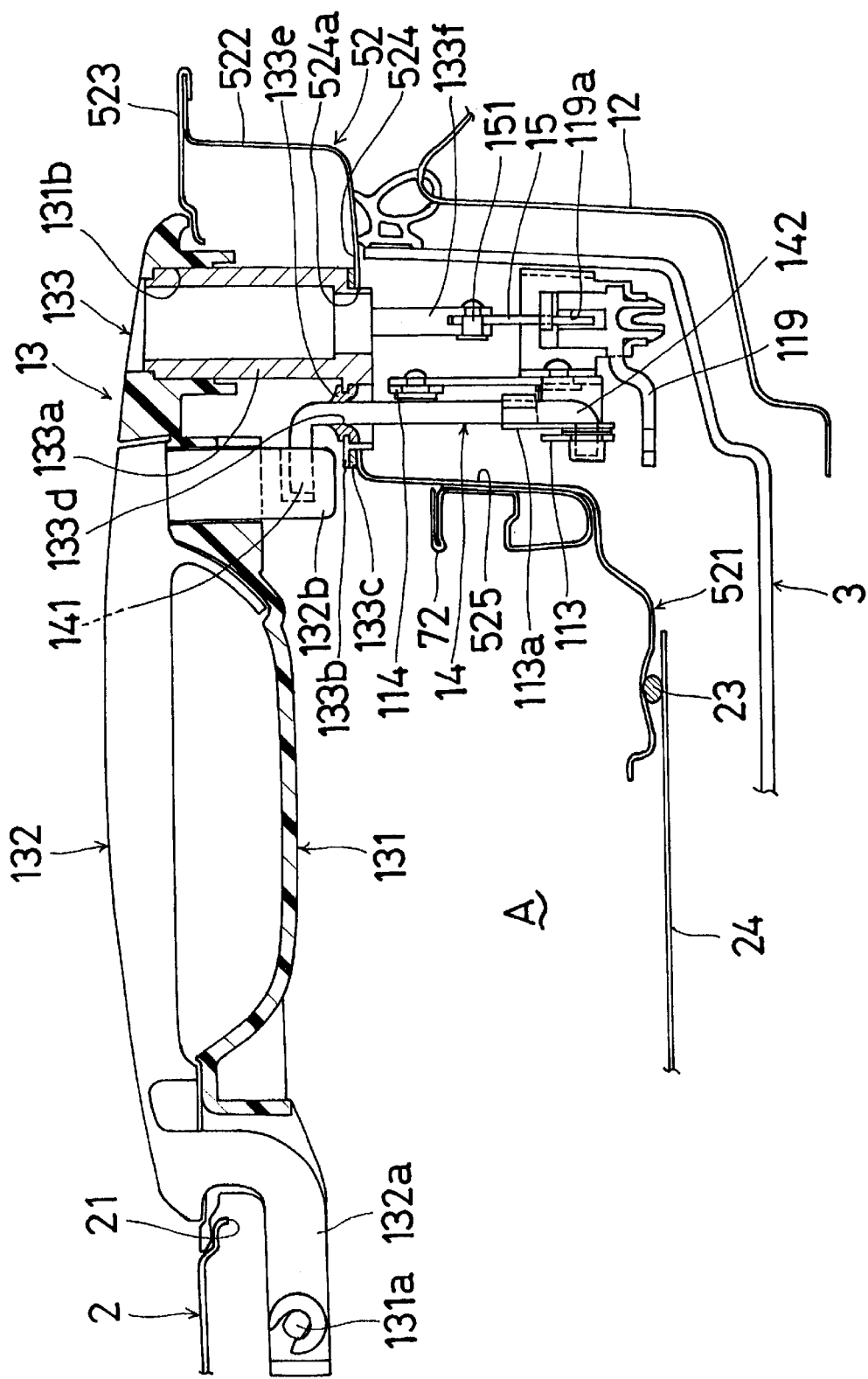
FIG. 6 illustrates a horizontal cross-sectional view of the door lock operation system shown in FIG. 5 when it is assembled.
Figure 7:
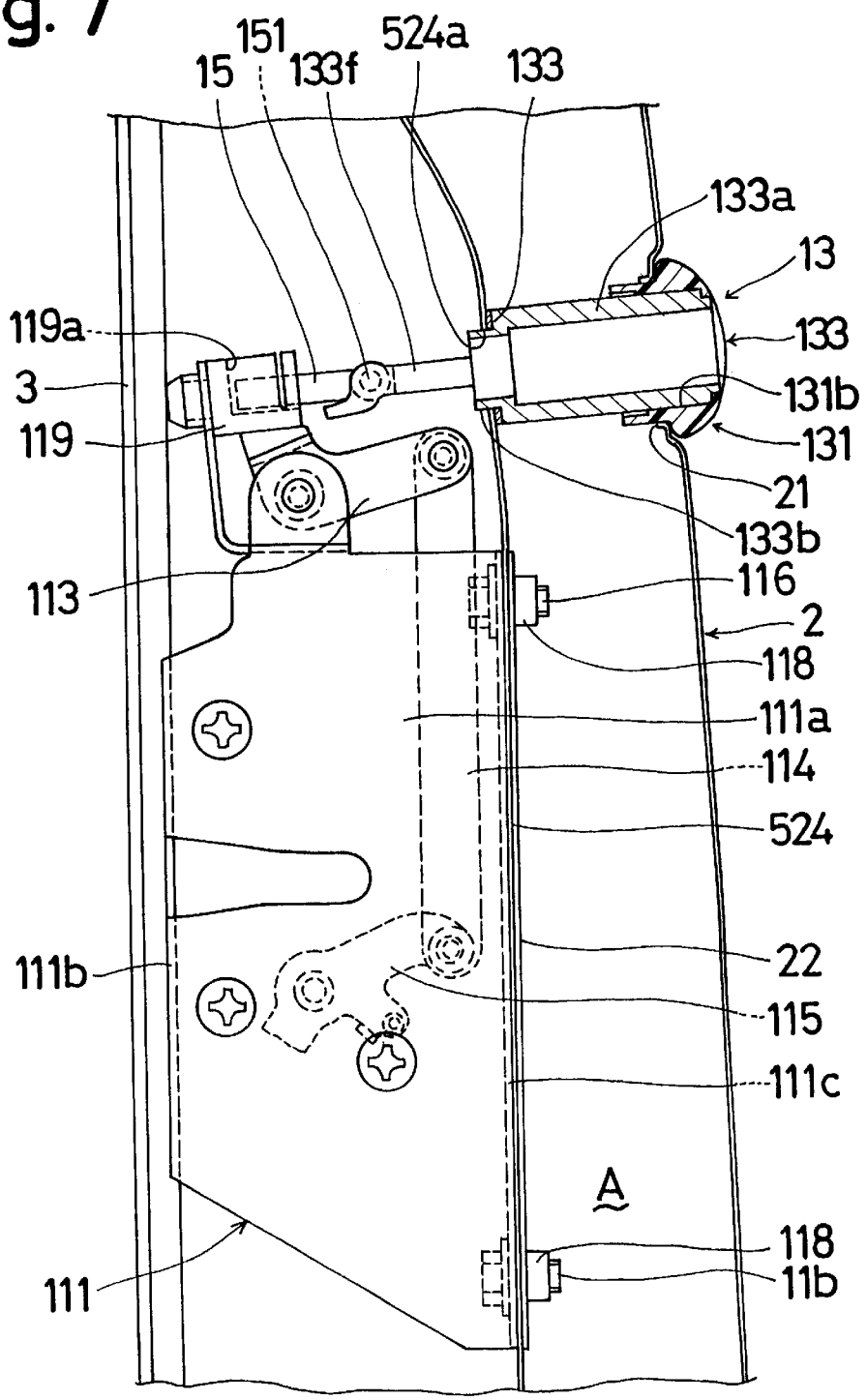
FIG. 7 illustrates a vertical cross-sectional view of the door lock operation system shown in FIG. 5 when it is assembled.
Figure 8:
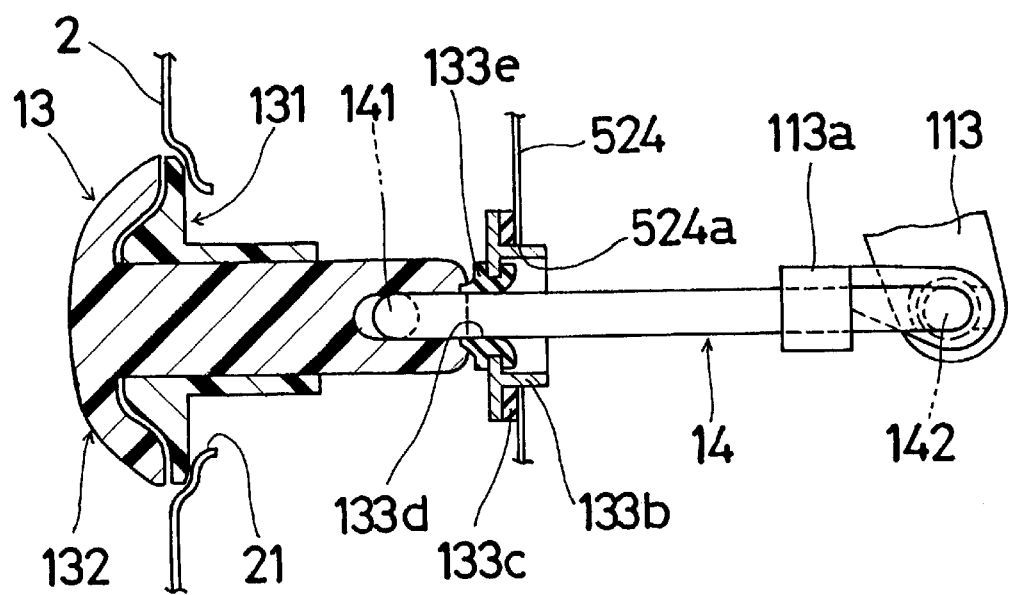
FIG. 8 illustrates a relation between a handle and an opening member of the door lock operation system shown in FIG. 5.
Figure 9:
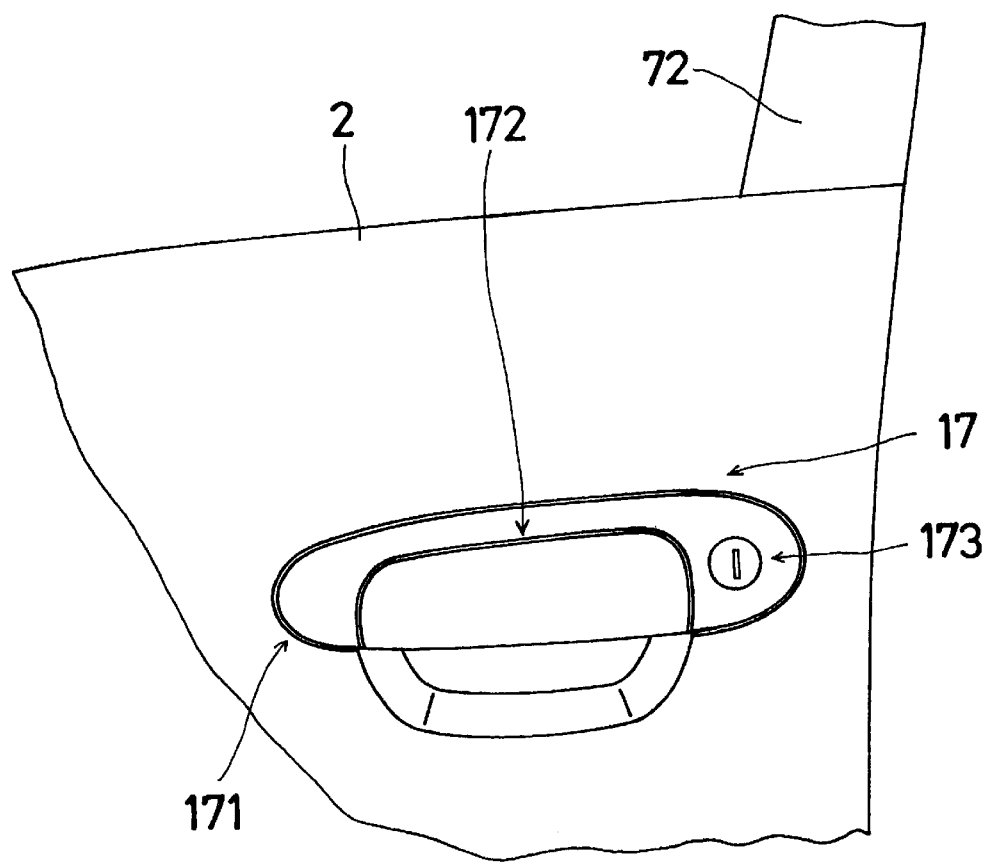
FIG. 9 illustrates a front view of a door lock operation system in accordance with another embodiment of the present invention.
Figure 10:
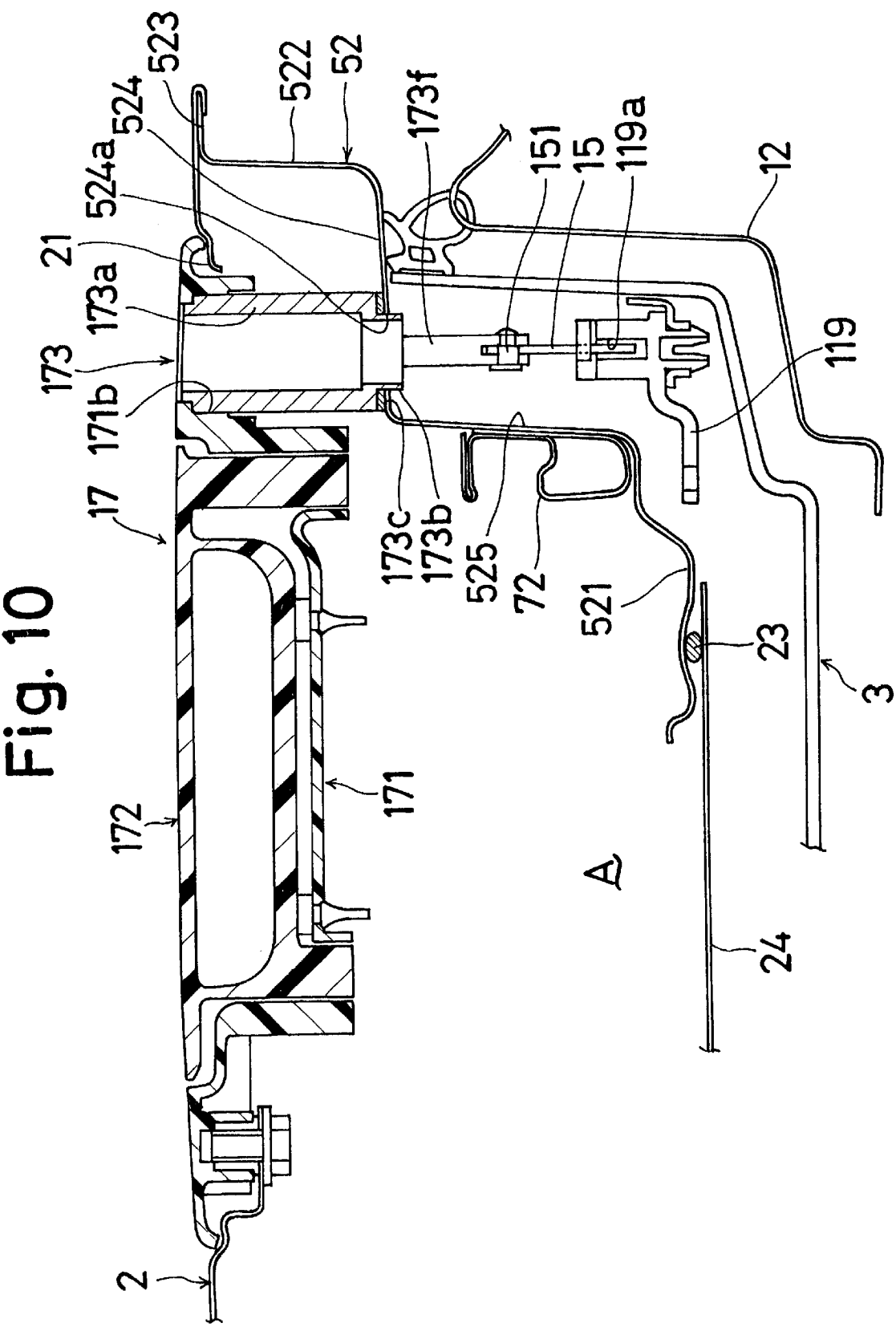
FIG. 10 illustrates a horizontal cross-sectional view showing how a door key cylinder of the door lock operation system shown in FIG. 9 is assembled.
Figure 11:
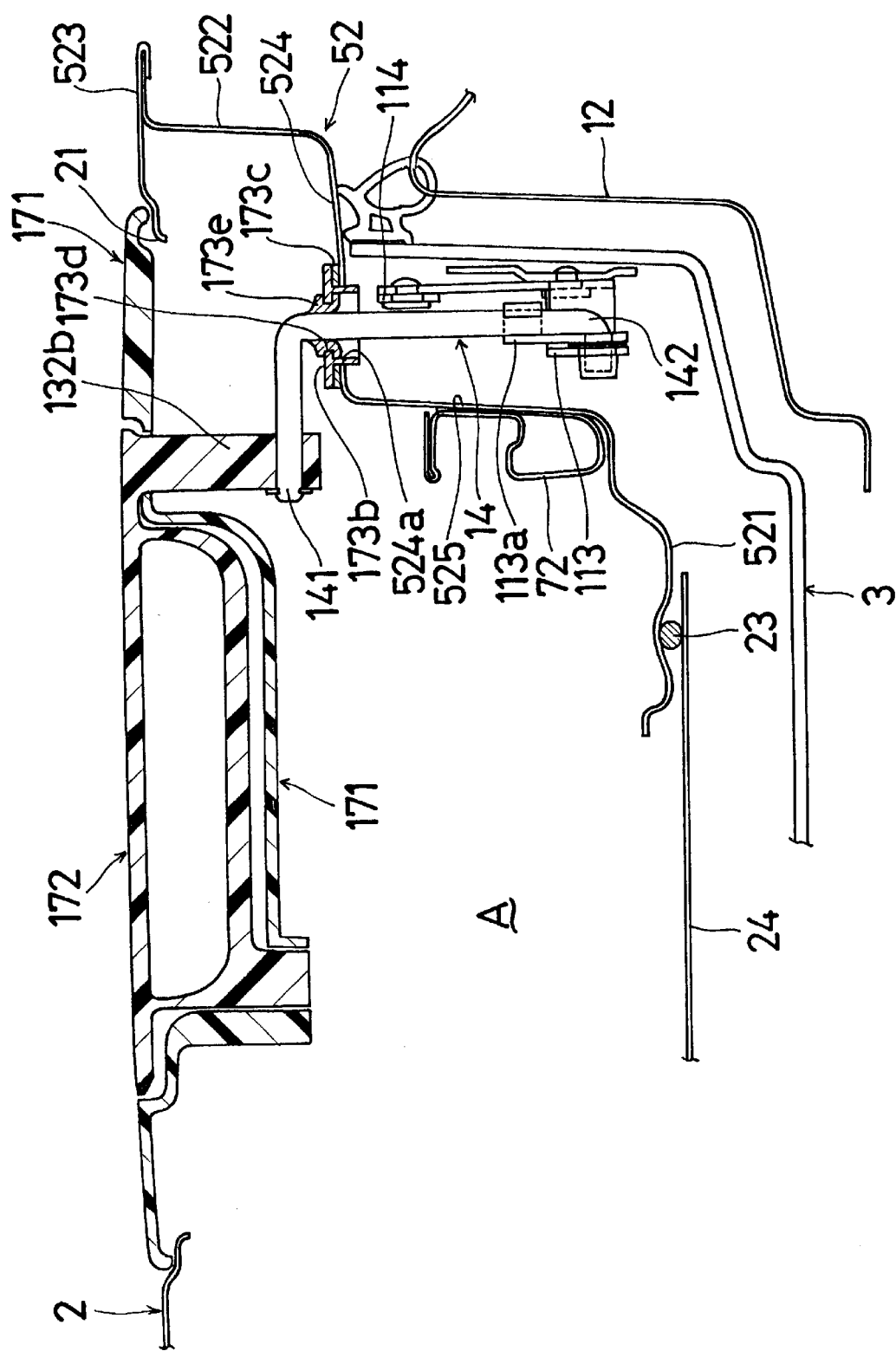
FIG. 11 illustrates a horizontal cross-sectional view of a handle of the door lock operation system shown in FIG. 8 when it is assembled.

As can be seen in FIG. 4, the lock side panel 52 of the door inner panel 5 has a horizontal wall 521 and a vertical wall 522 which constitute a substantially L-shaped structure. The lock side panel 52 is placed at the interior side of the door outer panel 2 in such a manner that the horizontal wall 521 is parallel to the door outer panel 2, with a gap therebetween. The lock side panel 52 has a flange wall 523 extending from the vertical wall 522 in an opposite direction of the horizontal wall 521, and the flange wall 523 is fixed with a rear periphery of the outer panel 2. In addition, at the interior side of the vertical wall 522, a concave portion 525 is formed at a center portion in the vertical direction so as to form a horizontal wall 524 which is in parallel to the horizontal wall 521.

The door lock device 11 is provided with a latch mechanism 112 and is accommodated in a base plate 111. The base plate 111 has a substantially U-shaped cross-section, which is defined by a vertical wall 111a and flange walls 111b and 111c extending from opposite ends of the vertical wall 111a, respectively. The latch mechanism 112 is designed to engage with and disengage from a striker (not shown) secured to the vehicle body 12. When an outside lever 113 of the door lock device 11, which is rotatably mounted on the base plate 111, is rotated, the resultant rotation is transmitted, by way of the link 114 and an open lever 114a, to the latch mechanism 112. Thus, the latch mechanism 112 is disengaged from the striker, with the result that the door 1 becomes ready for being opened relative to the vehicle body 12. By contrast, a key lever 119 which is also rotatably mounted on the door lock device 11 and operates, by way of a locking lever (not shown), to establish a released condition between the open lever 114a and the latch mechanism 112, when engaged, results in that the door 1 becomes latched. The thus constructed door lock device 11 is accommodated in the concave portion 525 of the lock side panel 52 from the vehicle interior side such that the vertical wall 111a of the base plate 111 is in substantial opposition to the vertical wall of the lock side panel 52. The door lock device 11 is fixedly mounted on an interior surface of the door inner panel 5, such that the pair of opposed flange walls 111b and 111c of the base plate 111 are fastened to the horizontal walls 521 and 524, respectively, by a combination of a bolt 115 and a nut 117 and a combination of a bolt 116 and a nut 118, respectively. Thus, such a fastening of the door lock device 11 to the horizontal walls 521 and 524 of the lock side panel 52 from the vehicular interior side can be done very easily. While the door lock device 11 engages the vehicular door 1 with the vehicular body 12, a load applied to the door 1 for opening the door 1 acts as a pulling force on each of the bolts 115 and 116 which connect the door lock device 11 to the door 1, thereby establishing a mechanical strength. It is to be noted that the portion of the lock side panel 52 which is fastened by the bolt 115 and the nut 117 is reinforced, from the vehicular outdoor side or the door interior, by being overlaid with a reinforcement member 22 which is welded to the center pillar member 72 of the door frame 7. Thus, the degree of mounting reinforcement of the door lock device 11 is further increased.

The door lock device 11 is placed between the door inner panel 5 and the door trim 3 so as not to be seen from the vehicular interior side. Thus, no members related to opening and closing the door are allocated or provided in the interior space A in which the window pane is accommodated. Therefore, even if a tool (not shown) is inserted in the interior space A along the window pane, the door lock device 11, when in its latched condition, can not be released, thereby improving the anti-theft function of the door lock device 11.

Hereinafter, a door lock operation system 13 in accordance with a first embodiment of the present invention will be explained in detail.

Referring to FIGS. 5 through 8, the door lock operation system 13 includes, a bezel 131, an outside door handle 132, and a door key-cylinder 133.

The door outer panel 2 is provided with an opening 21. The bezel 131 is fitted into the opening 21 from the vehicle outside (corresponding to the upper side in FIG. 6) and is secured to an outside surface of the door outer panel 2 by means of screws (not shown). The door outside handle 132 is, at its front leg portion 132a, in fitting engagement with a pin portion 131a of the bezel 131. Thus, the door outside handle 132 is supported by the bezel 131 in rotatable manner in the in-and-out directions of vehicle body (corresponding to the vertical direction in FIG. 6). In addition, the door outside handle 132 has a rear arm portion 132b which extends into the interior space A after passing through the bezel 131. The rear portion 132b of the door outside handle 132 is operatively connected, by way of a connecting rod 14, to the outside lever 113 of the door lock device 11. It is to be noted that the rear arm portion 132b of the door outside handle 132 is positioned between the door outer panel 2 and the door inner panel 5 in the interior space A. The door key-cylinder 133 is fitted into a passing-through hole 131b formed in the bezel 131 and is secured thereto by screws (not shown). The door key cylinder 133 is linked to the key lever 119 by a connecting rod 15.

The horizontal wall 524 of the lock side panel 52 of the door inner panel 5 is formed with a passing-through hole 524a which opposes the opening 21 formed in the door outer panel 2. A rotary case 133a, which is a main portion of the door key cylinder 133, has an integral flange portion 133b. The door key cylinder 133 extends across the interior space A and is fitted in the passing-through hole 524a of the horizontal wall 524 so as to be rotatable along the flange portion 133b of the rotary case 133a. Under such a structure, the door key cylinder 133 is supported at two portions, the door outer panel 2 and the door inner panel 5, thereby ensuring stable support of the door key cylinder 133 with a smaller number of fastening devices than is required in conventional door lock operation systems. The flange portion 133b is provided around the passing-through hole 524a with a bush-shaped seal member 133c, which is in fluid-tight engagement with the horizontal wall 524 in order to establish a fluid-tight relationship between the rotary case 133a and the horizontal wall 524.

The flange portion 133b of the rotary case 133a is formed with a passing-through hole 133d which is positioned relative to the passing-through hole 524a such that the connecting rod 14 is able to pass through both of the passing-through holes 133d, 524a. The connecting rod 14 is movably supported in the passing-through hole 133d so as to be movable in the in-and-out direction of the vehicle body. The connecting rod 14 is connected, at its end portion 141 outside the door inner panel 5, with the arm portion 132b of the door outside handle 132, while another end portion 142 of the connecting rod 14 is connected, inside the door inner panel 5 and in a clamping manner, to a clip 113a, which is supported by the outside lever 113. In addition, within the passing-through hole 133d, a lip-shaped seal member 133e is fixed. The elastic contact between the seal member 133e, the passing-through hole 133d and the connecting rod 14 ensures a fluid-tight relationship between the connecting rod 14 and the flange portion 133b. Thus, manipulating the door outside handle 132 allows the connecting rod to move in an axial direction (corresponding to the vehicle interior in-and-out direction), thereby enabling rotation of the outside lever 113 of the door lock device 11.

The connecting rod 15 is arranged in the interior side of the door inner panel 5 and parallel to the connecting rod 14. The connecting rod 14 is oriented in the vehicle longitudinal direction corresponding to the right-and-left direction in FIG. 5. At one end of the connecting rod 15, which is located more on the interior side of the vehicle body than the door inner panel 5, the connecting rod 15 is pivoted by a pin 151 to a rotary rod 133f. The rotary rod 133f is a component of the door key cylinder 133. On the other hand, the other end of the connecting rod 15, which is also located more on the interior side of the vehicle body than the door inner panel 5, is connected to a slot 119a of the key lever 119 in male-and-female fitting manner. Such fitting allows an offset between the axes of the respective rods 15 and 133f. Thus, when the door key cylinder 133 is manipulated, the connecting rod 15 is rotated, thereby rotating the key lever 119 of the door lock device 11.

The door lock operation system 13 is assembled according to the following procedure. First, the bezel 131 is mounted to the door outer panel 2 from the outside of the vehicle body in such a manner that the bezel 131 is in the form of an integration or unit of the door outside handle 132 and the door key cylinder 133. The door outside handle 132 is connected to the connecting rod 14 and the door key cylinder 133 is connected to the connecting rod 15. Thereafter, the door lock device 11 is mounted to the door inner panel 5 from the inside of the vehicle body in such a manner that the clip 113a of the outside lever 113 and the fitting slot 119a of the key lever 119 are fitted with the connecting rod 14 and the connecting rod 15, respectively. Thus, the coupling or association between the door outside handle 132 and the door key cylinder 133 in the door lock operation system 13 and the coupling or association between the outside lever 113 and the key lever 119 in the door lock device 11 are established in a fitting manner inside the vehicle body, thus simplifying the foregoing assembly procedure. In addition, such an assembly procedure allows for the possibility of adhering the cover 24 onto the door inner panel 5 before assembly of the door lock device 11 and the door lock operation system, which improves a modular assembly of the vehicle door 1.

Hereinafter a door lock operation system 17 in accordance with a second embodiment of the present invention will be explained in detail.

Referring to FIGS. 9 through 13, the door lock operation system 17 includes, a bezel 171, an outside door handle 172, and a door key cylinder 173.

The bezel 171 is fitted, from the vehicle body outside (or the upper side in FIG. 10), in the opening 21 of the door outer panel 2 and is secured thereto by screws at the outside surface of the door outer panel 2 (not shown). The outside door handle 172 is pivoted by a pin 172a to the bezel 171 so as to be rotatable in the in-and-out direction of the vehicle body corresponding to the vertical direction in FIG. 13. The outside door handle 172 has an arm portion 172b which extends in the vehicle body inside direction (or the downward direction in FIG. 9) through the bezel 171 and is engaged with the outside lever 113 of the door lock device 11 by the connecting rod 14. It is to be noted that the arm portion 172b is positioned in the door inner space A defined between the door outer panel 2 and the door inner panel 5. The door key cylinder 173 is secured to the bezel 171 after being fitted into a passing-hole 171b of the bezel 171. The door key cylinder 173 is linked to the key lever 119 of the door lock device 11 by the connecting rod 15.

A rotary key case 173a, a component of the door key cylinder 173, has an integral flange portion 173b. The door key cylinder 173 crosses or traverses over the door inner space A and passes through the passing-through hole 524a of the horizontal wall 524 of the door inner panel 5 via the flange portion 173b of the rotary case 173a, thereby being supported by the horizontal wall 524. Thus, the opposite ends of the door key cylinder 173 are supported by the door outer panel 2 and the door inner panel 5, respectively, which means that supporting the door key cylinder 173 can be done with smaller number of parts. The flange portion 173b is fixed with a bush-shaped seal member 173c which is provided in the vicinity of the passing-through hole 524a. The seal member 173c is in close contact with the horizontal wall 524, thereby establishing a fluid-tight relationship between the rotary case 173a and the horizontal wall 524.

The flange portion 173b of the rotary case 173a is formed with a passing-through hole 173d which is in coaxial alignment with the passing-through hole 524a. The connecting rod 14 passes movably through the passing-through hole 173d so as to extend in the in-and-out direction of the vehicle body. The connecting rod 14 has an end 141 positioned outside the door inner panel 5. The end 141 is connected to the arm portion 172b of the door outside handle 172. The connecting rod 14 has an end 142 positioned inside the door inner panel 5. The end 142 is connected to the clip 113a in fitting manner. In addition, around the passing-through hole 173d, there is provided a lip-shaped seal member 173e, which is in close contact with the outer surface of the connecting rod 14, thereby establishing a fluid-tight relationship between the connecting rod 14 and the flange portion 173b. Thus, manipulating the door outside handle 172 causes the connecting rod 14 to move in the axial direction (vehicle interior in-and-out direction), thereby allowing the outside lever 113 of the door lock device 11 to rotate.

Figure 12:
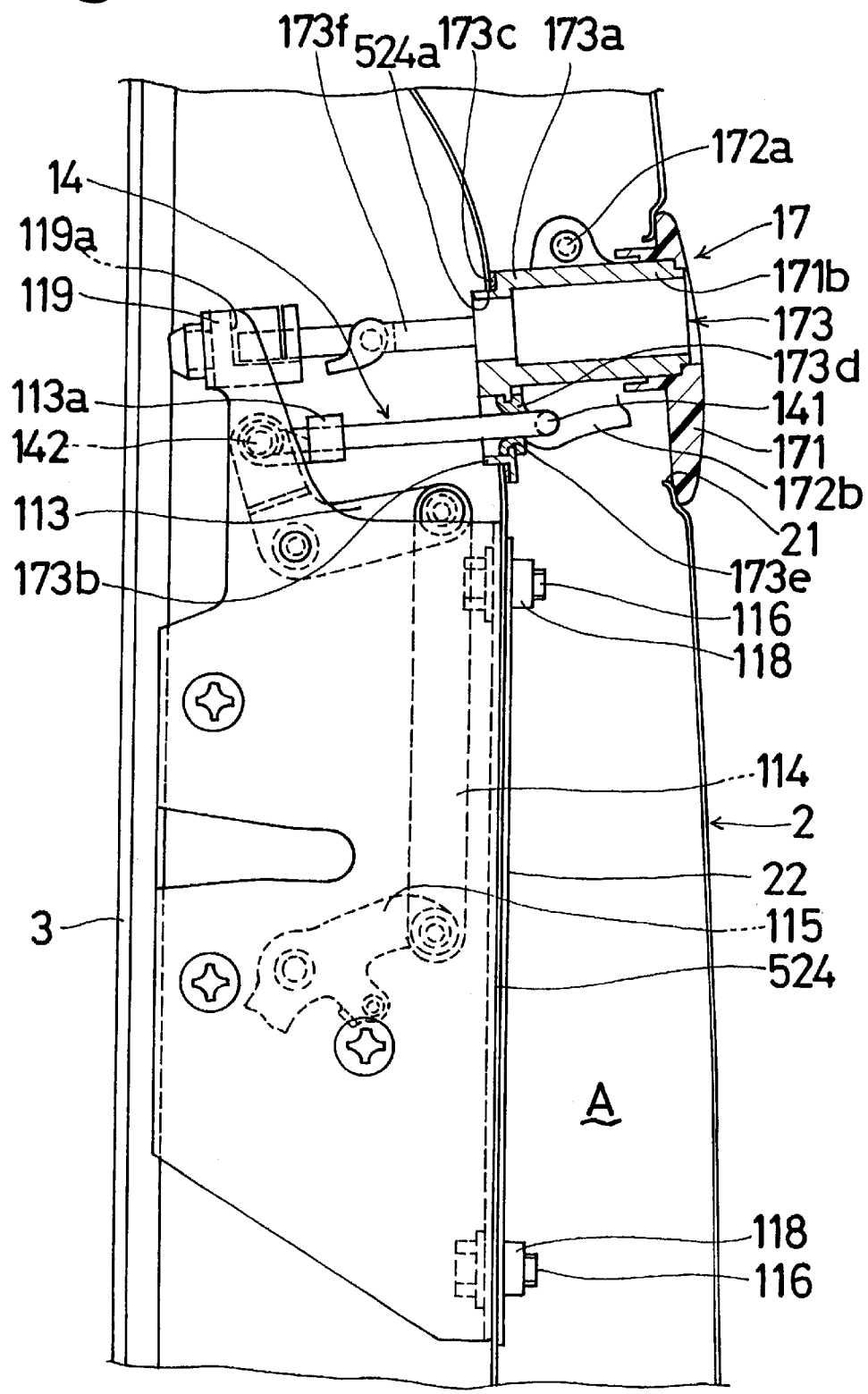
FIG. 12 illustrates a vertical cross-sectional view of the door lock operation system shown in FIG. 9 when it is assembled.
Figure 13:
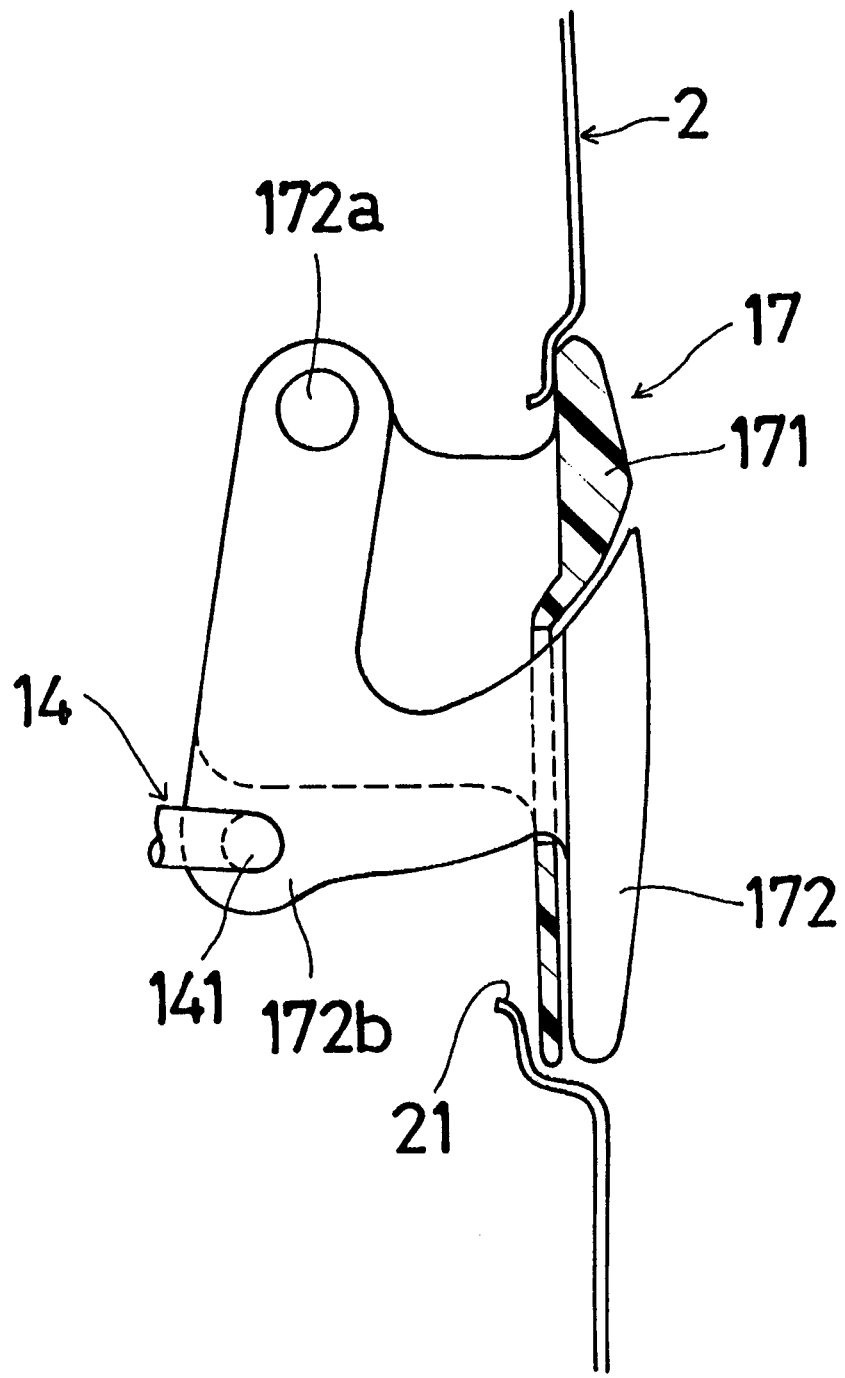
FIG. 13 illustrates a cross-sectional view of a handle supporting mechanism of the door lock operation system shown in FIG. 9.

The connecting rod 15 is placed inside the door inner panel 5 and extends, in parallel to the connecting rod 14, in the vehicle vertical direction (the vertical direction in FIG. 12). At one end of the connecting rod 15, which is located closer to the vehicle body interior side than the door inner panel 5, the connecting rod 15 is pivoted, by a pin 151, to a rotary rod 173f, which is a component of the door key cylinder 173. On the other hand, the other end of the connecting rod 15 which is also located closer to the vehicle body interior side than the door inner panel 5, the connecting rod 15 is connected to the slot 119a of the key lever 119 in male-and-female fitting manner. Such fitting allows an offset between the axes of the respective rods 15 and 173f. Thus, when the door key cylinder 173 is manipulated, the connecting rod 15 is rotated, thereby rotating the key lever 119 of the door lock device 11.

The door lock operation system 17 is assembled according to the following procedure. First, the bezel 171 is mounted to the door outer panel 2 from the vehicle body outside in such a manner that the bezel 171 is in the form of an integration or unit of the door outside handle 172 and the door key cylinder 173. The door outside handle 172 is connected to the connecting rod 14 and the door key cylinder 173 is connected to the connecting rod 15. Thereafter, the door lock device 11 is mounted to the door inner panel 5 from the vehicle body inside in such a manner that the clip 113a of the outside lever 113 and the fitting slot 119a of the key lever 119 are fitted with the connecting rod 14 and the connecting rod 15, respectively. Thus, the coupling or association between the door outside handle 172 and the door key cylinder 173 in the door lock operation system 17 and the coupling or association between the outside lever 113 and the key lever 119 in the door lock device 11 are established in fitting manner inside the vehicle body, which simplifies the foregoing assembly procedure.

In addition, the open lever 114a of the door lock device 11 is connected to the door inside handle 18 (FIG. 1), which is provided in the door trim 3, by way of an inside lever (not shown) and a connecting rod (not shown) placed at the interior side of the door inner panel 5. The connecting rod (not shown) causes the open lever 114a to rotate when the door inside handle 18 is manipulated. The locking lever (not shown) of the door lock device 11 is connected to the lock knob 19 positioned in the door trim 3 by a connecting rod (not shown) provided in the door inner panel at the vehicle interior side thereof, thereby allowing the locking lever to rotate when the lock knob 19 is manipulated.

As an alternative, a cable consisting of a wire and an outer tube (both not shown) may be substituted for the connecting rods 14 and 15.

The invention has thus been shown and described with reference to specific embodiments, however, it should be understood that the invention is in no way limited to the details of the illustrated structures but changes and modifications may be made without departing from the scope of the appended claims.

What is claimed is:

1. A vehicular door lock operation system comprising:
   a door inner panel secured to an interior surface of a door outer panel;
   the door inner panel having a through hole;
   a handle rotatably supported on the door inner panel and linked to an opening member of a door lock device;
   a door key cylinder passing through the through hole in the door inner panel and linked to a locking member of the door lock device;
   a connecting member connecting the handle and the opening member of the door lock device;
   the connecting member passing through the through hole in the door inner panel; and
   a supporting portion positioned adjacent to the door key cylinder and supporting the connecting member.

2. A vehicular door lock operation system as set forth in claim 1, wherein the supporting portion is a flange portion integrally formed with a rotary case of the door key cylinder.

3. A vehicular door lock operation system as set forth in claim 2, wherein the flange portion has a passing-through hole through which the connecting member passes and wherein a seal member is positioned around the passing-through hole in the flange portion for establishing a fluid-tight relationship between the connecting member and the flange portion.

4. A vehicular door lock operation system as set forth in claim 1, wherein the door lock device is mounted on an interior surface of the door inner panel.

5. A vehicular door lock operation system as set forth in claim 2, wherein a seal member is mounted on the flange portion and is positioned around the through hole in the door inner panel for establishing a fluid-tight relationship between the rotary case and the door inner panel.

6. A vehicular door comprising:
   a door outer panel;
   a door inner panel secured to an interior surface of the door outer panel;
   a trim secured to an interior surface of the door inner panel and constituting an inner profile of the vehicle interior;
   a door lock device having an opening member and a locking member, the door lock device being secured to the interior surface of the door inner panel and positioned between the door inner panel and the door trim;
   a door lock operation system including a handle mounted on the door outer panel and linked to the opening member of the door lock device, a door key cylinder linked to the locking member of the door lock device, a first connecting member and a second connecting member, each of said first and second connecting members having first and second ends, said first end of the first connecting member being connected to the handle, said second end of the first connecting member being detachably connected to the opening member of the door lock device, said first end of the second connecting member being connected to the door key cylinder, and said second end of the second connecting member being detachably connected to the opening member of the door lock device;
   the door key cylinder including a rotary case, the first connecting member passing through a portion of the rotary case and being supported by the rotary case; and
   the rotary case passing through a through hole provided in the door inner panel and being supported on the door inner panel.

7. A vehicular door as set forth in claim 6, wherein the first connecting member passes through the through hole in the door inner panel.

* * * * *